(12) United States Patent
Park

(10) Patent No.: US 6,192,164 B1
(45) Date of Patent: Feb. 20, 2001

(54) DIGITAL SCAN CONVERSION METHOD AND APPARATUS FOR AN ULTRASONIC SYSTEM

(75) Inventor: Yong-Heon Park, Seoul (KR)

(73) Assignee: Medison Co., Ltd. (KR)

( * ) Notice: Under 35 U.S.C. 154(b), the term of this patent shall be extended for 0 days.

(21) Appl. No.: 09/028,981

(22) Filed: Feb. 25, 1998

(30) Foreign Application Priority Data

Feb. 25, 1997 (KR) .................................................. 97-5674

(51) Int. Cl.$^7$ ...................................................... G06K 9/32
(52) U.S. Cl. ............................................ 382/300; 382/128
(58) Field of Search ................................... 358/428, 429, 358/447; 382/300, 128, 254, 257, 286, 299, 132, 275; 348/442

(56) References Cited

U.S. PATENT DOCUMENTS

| | | | |
|---|---|---|---|
| 4,193,092 | * | 3/1980 | Stoffel .................................. 358/428 |
| 4,214,269 | * | 7/1980 | Parker et al. ......................... 348/442 |
| 4,468,747 | * | 8/1984 | Leavitt et al. ........................ 358/140 |
| 4,471,449 | * | 9/1984 | Leavitt et al. ........................ 358/140 |
| 4,581,636 | * | 4/1986 | Blaker et al. ......................... 358/112 |
| 4,689,675 | * | 8/1987 | Tchorbajian et al. ................. 358/140 |
| 4,759,372 | * | 7/1988 | Umemura et al. .................... 128/660 |
| 5,125,042 | * | 6/1992 | Kerr et al. ............................. 358/428 |
| 5,383,366 | * | 1/1995 | Wallingford et al. .................. 73/602 |
| 5,431,167 | * | 7/1995 | Savord ............................. 128/660.07 |
| 5,515,457 | * | 5/1996 | Osano .................................. 358/428 |
| 5,528,302 | * | 6/1996 | Basoglu et al. ....................... 348/442 |
| 5,644,661 | * | 7/1997 | Smith et al. .......................... 382/300 |
| 5,671,154 | * | 9/1997 | Iizuka et al. ........................... 73/602 |
| 5,832,143 | * | 11/1998 | Suga et al. ........................... 382/300 |

* cited by examiner

Primary Examiner—Yon J. Couso
(74) Attorney, Agent, or Firm—Dilworth & Barrese, LLP

(57) ABSTRACT

A digital scan converter (DSC) in an ultrasonic system stores a received ultrasonic signal and displays the ultrasonic signal via a display. The DSC calculates pixel data at a corresponding pixel point via an interpolation process using ultrasonic image data at sampling point which is positioned on two scan lines neighboring to the pixel point for displaying and has the same radius from a probe as that of the pixel point for displaying. Thus, a positional error does not exist on a rectangular coordinate system, and thus a picture quality is enhanced by eliminating artifact.

10 Claims, 5 Drawing Sheets

$I_0 = f(A,B,C,D)$
$I_1 = f(A,B,C,D)$ $I_0 = f(B,D)$
$I_1 = f(A,C)$

DIGITAL SCAN CONVERSION METHOD AND APPARATUS FOR AN ULTRASONIC SYSTEM

BACKGROUND OF THE INVENTION

The present invention relates to digital scan conversion in an ultrasonic system, and more particularly, to a digital scan conversion method and apparatus for interpolating sampled data whose position is represented by a polar coordinate system, and thus calculating pixel data whose position is represented by a rectangular coordinate system.

A general ultrasonic system emits an ultrasonic signal to an object to be tested, and receives and samples the ultrasonic signal reflected from the object at a predetermined period, to thereby obtain tested data. A digital scan converter used in the ultrasonic system has various functions such as image information display and image processing, in addition to a basic function for storing the ultrasonic signal acquired from the object to be tested, and supplying the stored data to a display device. The digital scan converter stores digital data obtained from the ultrasonic signal according to scan modes provided by the ultrasonic system, for example, a B mode, an M mode, a D mode, a CD mode, in a memory, and reads the data stored in the memory if necessary, to then display the read data via a display device.

A conventional ultrasonic system uses coordinate conversion in order to represent data whose position is represented by a polar coordinate system into that represented by a rectangular coordinate system. The coordinate conversion creates degradation of picture quality and artifact. To solve this problem, many studies for interpolating a pixel position having no data on a rectangular coordinate system and filling data therein have been performed.

FIG. 1 is a graphical view for explaining an interpolation method which is performed in a conventional digital scan converter. In FIG. 1, a symbol "○" represents an actual sampling point which is positioned on a scan line represented by a polar coordinate system, and a symbol "◇" represents a pixel point on which data stored in a memory is displayed. The data in the pixel points ($I_0$, $I_1$) shown in FIG. 1 is calculated using a predetermined interpolation equation which is made by four data sampled at the sampling points A, B, C and D on mutually neighboring scan lines and a distant ratio between the sampling points A, B, C and D. However, such an interpolation method is not ideal but approximates only an ideal interpolation method, and thus remains the degradation of picture quality and artifact.

SUMMARY OF THE INVENTION

To solve the above problems, it is an object of the present invention to provide a digital scan conversion method and apparatus in an ultrasonic system capable of providing an ultrasonic image having no degradation of picture quality and artifact, by interpolating sampled data having the same radial distance as that of a desired pixel position of pixel data to then obtain the pixel data of the desired pixel position.

To accomplish the above object of the present invention, there is provided a digital scan conversion method in an ultrasonic system having a probe, the digital scan conversion method comprising the step of:

interpolating sampled data obtained from sampling points which are positioned on two scan lines neighboring to a particular pixel point and have the same radius as that of the pixel point, in order to obtain pixel data corresponding to a particular pixel point.

There is also provided a digital scan conversion apparatus for use in an ultrasonic system having a probe, the digital scan conversion apparatus comprising: interpolation data calculation means for calculating pixel points positioned between two neighboring scan lines, sampling points for obtaining sampled data positioned on the two scan lines in correspondence to the pixel points, and interpolation data corresponding to the pixel points; storage means for storing the sampling clock representing the sampling points and the interpolation data therein; an input memory for storing the sampled data corresponding to the pixel point among the ultrasonic echo signal received by the probe, using the sampling clock stored in the storage means as write clock, and outputting the stored sampled data according to read clock; a radial interpolation table for outputting pixel data with respect to the pixel point using the corresponding interpolation coefficient supplied from the storage means and the sampled data output from the input memory; a frame memory for storing the pixel data output from the radial interpolation table; and an address controller for generating read clock for reading the sampled data corresponding to the interpolation data stored in the storage means from the input memory and a write address for storing the pixel data output from the radial interpolation table in the frame memory, on the basis of the pixel points output from the interpolation data calculation means.

BRIEF DESCRIPTION OF THE DRAWINGS

The preferred embodiments are described with reference to the drawings wherein.

DETAILED DESCRIPTION OF THE PREFERRED EMBODIMENTS

A preferred embodiment of the present invention will be described in detail with reference to the accompanying drawings.

Figure 1:
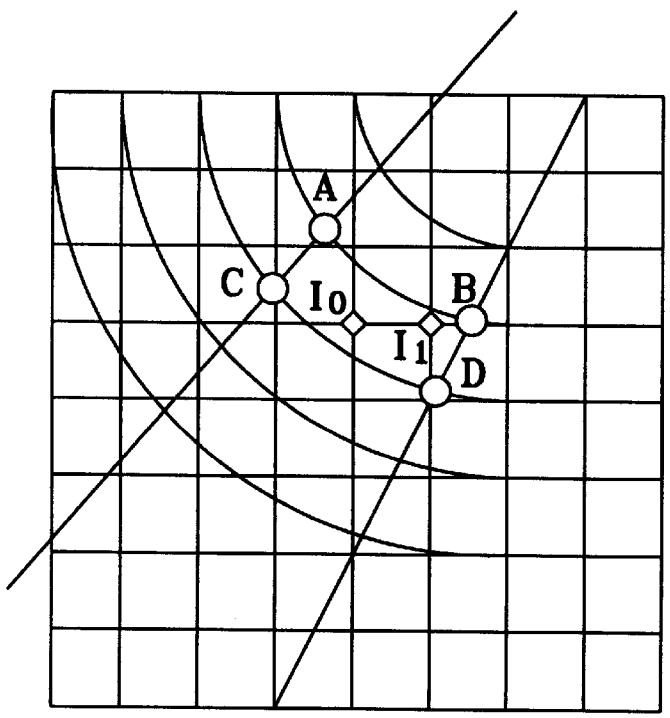
FIG. 1 is a graphical view for explaining an interpolation method which is performed in a conventional digital scan converter.
Figure 2:
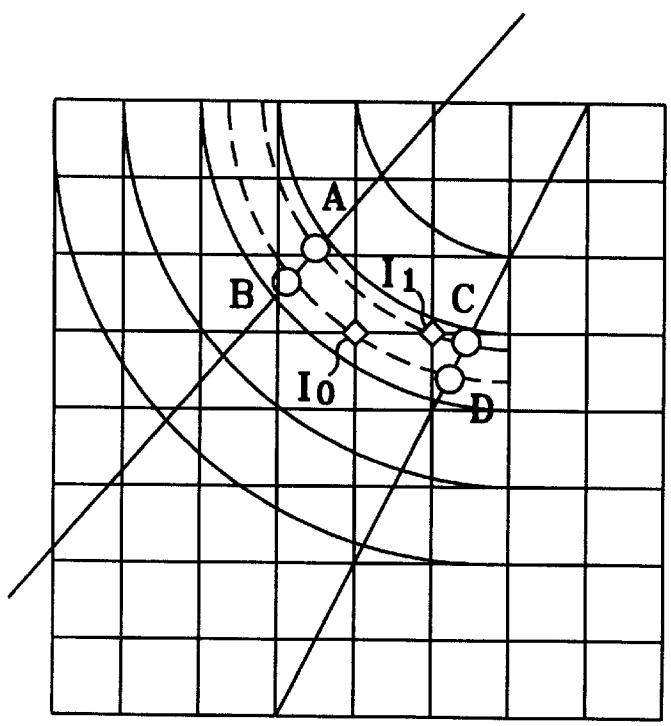
FIG. 2 is a graphical view for explaining a basic interpolation method which is performed in a digital scan converter according to the present invention.

An ideal interpolation method for digital scan conversion in an ultrasonic system, obtains pixel data being ultrasonic image data at a pixel point of an image to be displayed, via an interpolation process using ultrasonic image data at sampling point which is positioned on two scan lines neighboring to the pixel point and has the same radius from a probe as that of the pixel point. Referring to FIG. 2, data of a pixel $I_0$ to be interpolated is obtained using sampled data at the points B and D on two neighboring scan lines in the center of the pixel $I_0$. In the same manner, a pixel $I_1$ is obtained using sampled data at points A and C.

A probe (not shown) used in an ultrasonic system scans in such a manner that radial scan lines are formed. Assuming that the probe is positioned at the origin on the xy-coordinate system shown in FIG. 3, sampling points having the same radius from the probe can be represented as angles 0°–360° on a polar coordinate system. Therefore, these angles 0°–360° are mapped as address values 0–10000H in a memory for storing the sampled data. That is, 0° is associated with 0000H, 90° with 4000H, 180° with 8000H, and 270° with C000H.

Figure 3:
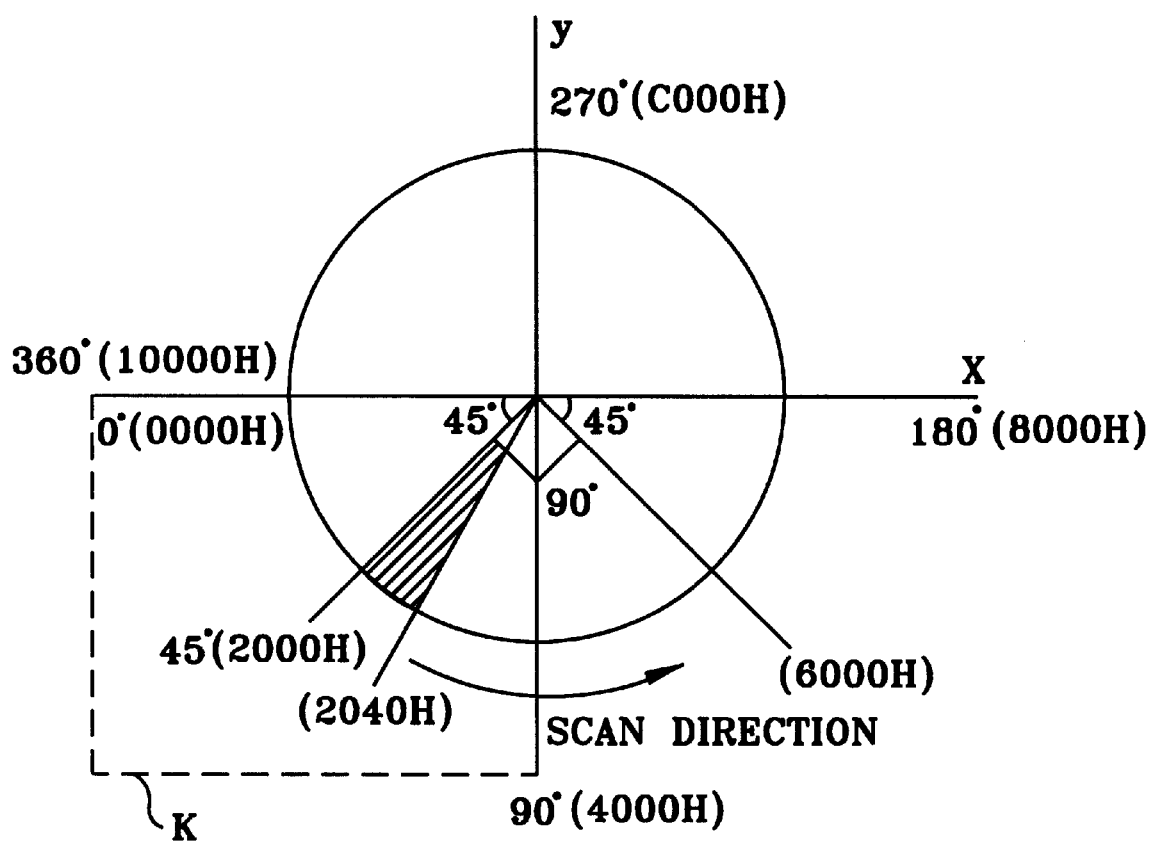
FIG. 3 is a graphical view for explaining a scanning angle θ of a probe which is mapped as an address value.

Fir example, a case where the radius of a probe is 60R, a scan angle range is 90°, and the number of scan lines in the scan angle range is 100, will be described below. If the center of the scan angle range is determined as the y-axis corresponding to the address value 4000H in the memory as shown in FIG. 3, the scan angle range is determined to have a region of 45° in both sides around the center. The angles in the scan angle range are mapped as the address values 2000H–6000H. Also, since there exist 100 scan lines in the scan angle range, the interval between two neighboring address values is 40H. If the interval between the neighboring address values is found, the angle between two neighboring scan lines can be also found. Thus, a desired pixel point can be found using the angle between he two neighboring scan lines.

Figure 5:
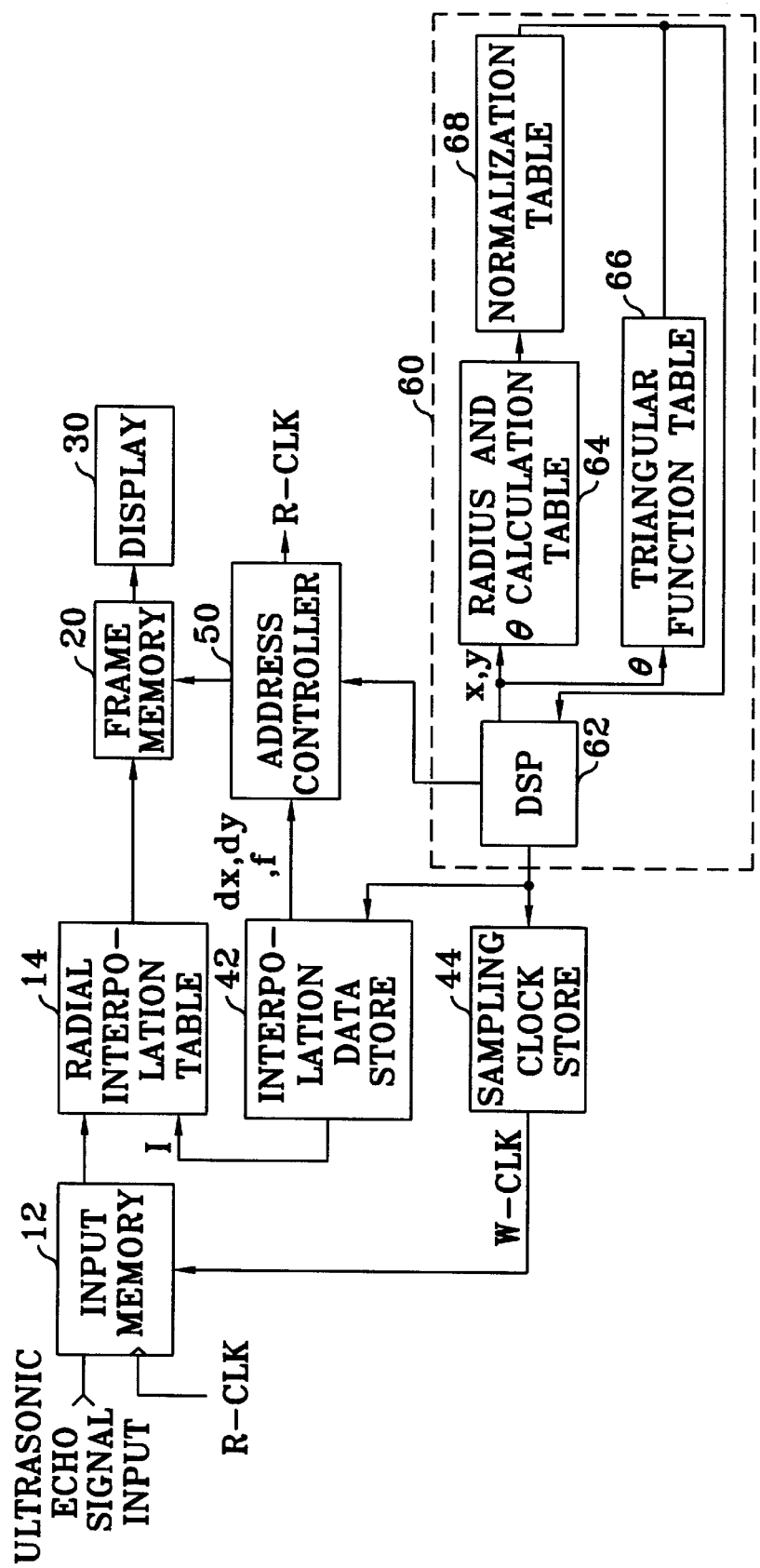
FIG. 5 is a block diagram showing an ultrasonic system including a digital scan converter according to a preferred embodiment of the present invention.

FIG. 5 is a block diagram showing an ultrasonic system including a digital scan converter according to a preferred embodiment of the present invention. The system shown in FIG. 5 includes an input memory 12 for storing sampled data acquired from a scan line, and a radial interpolation table 14 connected to the output of the input memory 12. The input memory 12 stores the received sampled data according to a write clock W-CLK and outputs the stored data according to read clock R-CLK. The radial interpolation table 14 interpolates the output of the input memory 12 using an interpolation coefficient I stored in an interpolation data store 42. A sampling clock store 44 stores sampling clock and supplies the stored sampling clock as the write clock of the input memory 12.

An address controller 50 receives pixel distance data dx and dy from the interpolation data store 42, generates a write address for storing the output of the radial interpolation table 14 in a frame memory 20, and outputs read clock R-CLK to the input memory 12.

An interpolation data calculator 60 includes a digital signal processor (DSP) 62 for generating sampling clock and the interpolation coefficient I. If the interpolation data calculator 60 is fabricated using the high-speed DSP having a very fast processing speed, interpolation data can be obtained at desired time. However, since the cost of the high-speed DSP is still very high, the overall system cost becomes high. Thus, in this embodiment of the present invention, the interpolation data calculator 60 is fabricated using a DSP 62 and tables 64, 66 and 68 which assist a calculation operation of the DSP 62. Thus, the interpolation data calculator 60 can obtain a desired speed data processing without raising the cost of the overall system. Among the tables 64, 66 and 68, the radius and θ calculation table 64 outputs a radius r and an angle θxy corresponding to a coordinate value (x, y) supplied from the DSP 62. The radius and θ calculation table 64 is implemented by a Table using the following equations (1) and (2).

$$\sqrt{x^2+y^2}=r \quad (1)$$

$$\tan^{-1} x/y = \theta_{xy} \quad (2)$$

The triangular function table 66 outputs sine data sin θ and cosine data cos θ corresponding to the angle θ supplied from the DSP 62. The data (sin θ, cos θ) output from the triangular function table 66 is input to the DSP 62. A normalization table 68 connected to the output of the radius and θ calculation table 64 normalizes a decimal fraction part below a decimal point of the radius r into a predetermined number of bits, in order to find an accurate sampling point. The radius normalized in the normalization table 68 is input to the DSP 62.

Figure 4:
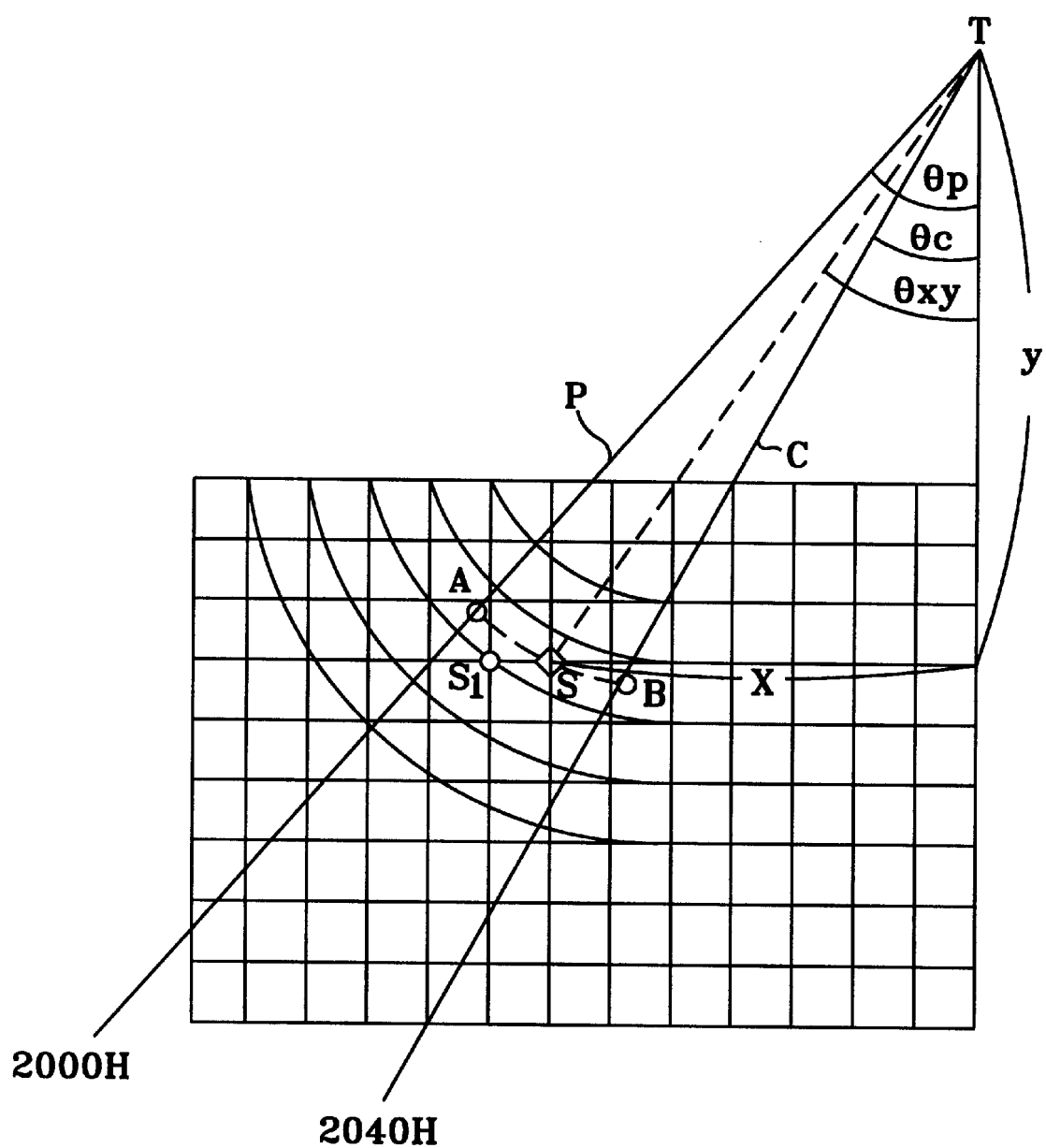
FIG. 4 is an enlarged view of a portion "K" shown in FIG. 3.

For convenience of explanation, when a start scan line is P and a neighboring next scan line is C, a vertex T formed by the crossed scan lines P and C is set as the origin of the rectangular coordinate system, to determine the coordinate on an abscissa as x, and the coordinate on an ordinate as y. Then, the angle between the y-axis and the scan line P is determined as $\theta_P$ and that between the y-axis and the scan line C is determined as $\theta_c$, whose relationship is shown in FIG. 4. The operation of the FIG. 5 system having the above structure will be described with reference to FIG. 4.

The interpolation data calculator 60 calculates the start coordinate (X, Y) relating to the point(s) of the pixel(s) to be displayed using the angle between two neighboring scan lines. For this, the DSP 62 supplies the angle θ relating to the start scan line P, the next scan line C and the start coordinate (X, Y) to the triangular function table 66. The triangular function table 66 outputs the sine value sin θ and the cosine value cos θ which correspond to the received angle θ to the DSP 62. The DSP 62 obtains the start coordinate (X, Y), using the radius r from the vertex T corresponding to the position of the probe to the start coordinate (X, Y) and the sin θ and cos θ supplied from the triangular function table 66. The start coordinate (X, Y) denotes a coordinate on the rectangular coordinate system. Then, the DSP 62 changes the pixel point by a unit distance (du, dv) on the rectangular coordinate system from the obtained start coordinate (X, Y), and supplies the rectangular coordinate representing the resultant pixel position to the radius and θ calculation table 64. Here, the du is a unit distance in the x-axis direction and the dv is a unit distance in the y-axis direction on the rectangular coordinate. The radius and θ calculation table 64 obtains the radius r and angle θxy corresponding to all the pixel pints supplied from the DSP 62.

Figure 6:
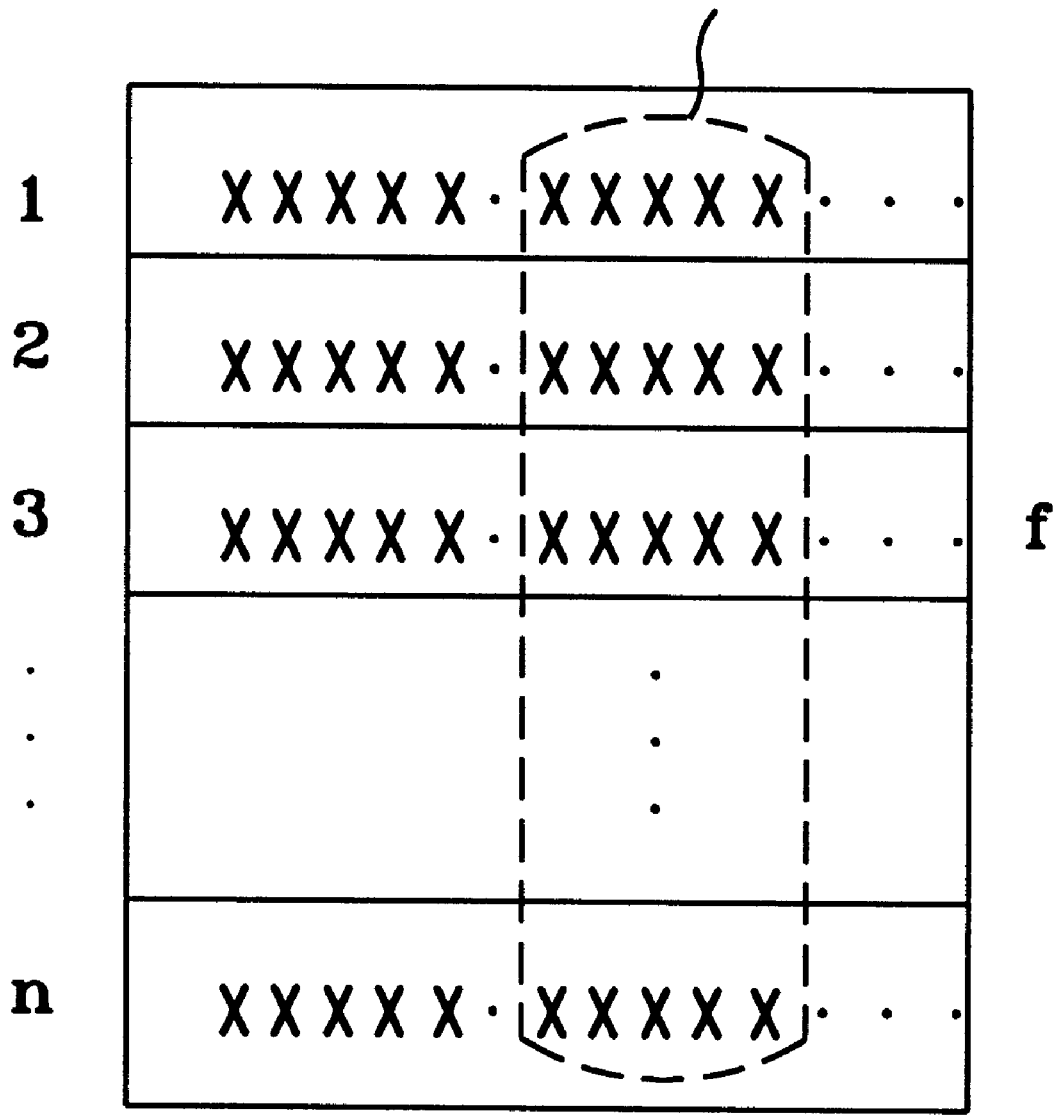
FIG. 6 is a diagram for explaining establishment and normalization of an interpolation flag.

FIG. 6 is a conceptual diagram for explaining normalization in a normalization table 68 of FIG. 5.

The radius from the vertex T to each pixel point is represented by an integer part and a fractional part. Since the normalization table 68 normalizes the fractional part into a predetermined number of bits N, the DSP 62 can obtain the normalized radius corresponding to each sampling point.

The DSP 62 judges whether or not a corresponding pixel point exists between the two scan lines P and C using the angle θxy. That is, it is judged whether the pixel point satisfies the inequality $\theta_P \leq \theta xy \leq \theta_c$. The DSP 62 determines only pixel points whose θxy meets the above condition to be effective, and aligns the pixel points in sequence where the size of the corresponding radius is small. Here, in the case that the pixels having the same radius r exist, the DSP 62 uses an interpolation flag f to represent the above. The pixel point which is positioned in the earliest position among the pixel points having the same radius has a raised interpolation flag f whose value is "1," and the remaining pixel points have a reduced interpolation flag f whose value is "0." Using the interpolation flag f set in this manner, it can be prevented that the data capacity of the input memory 12 is unnecessarily increased. Then, the DSP 62 calculates the pixel distance data dx and dy from the start coordinate to each pixel point using the aligned radius value. Also, the DSP 62 calculates the angle between the sampling point A the pixel point S on the start scan line P and the angle between the sampling point B the pixel point S on the next scan line C, and then calculates the interpolation coefficient I represented by the ratio of the angle between the A and S and that between the B and S (see FIG. 4).

The calculated pixel distance data dx and dy, the interpolation coefficient I and the interpolation flag f which correspond to each pixel point are stored in the interpolation data store 42.

The DSP 62 calculates the sampling start points based on the radius r possessed by each pixel point and the angles θ of the start scan line P and the next scan line C relating to the pixel point, in order to obtain the sampled data from the sampling point corresponding to the pixel points obtained in the above-described manner. The calculated sampling points are stored in the sampling clock store 44 in the form of the sampling clock.

When the ultrasonic system starts an ultrasonic scan operation, the sampling clock store 44 supplies the stored sampling clock as the write clock W-CLK of the input memory 12. The input memory 12 which is a first-in-first-out (FIFO) memory appropriate for storing the data according to the write clock W-CLK, stores an ultrasonic echo signal input via the probe according to the write clock W-CLK. Thus, the input memory 12 can store only the sampled data at the sampling point of time necessary for obtaining the ultrasonic image at the pixel point. Next, the DSP 62 loads addresses corresponding to the current scan lines, that is, the start scan line P and the next scan line C corresponding to the pixel point(s) to be currently interpolated, to the address controller 50. The address controller 50 outputs the read clock R-CLK for reading the data stored in the input memory 12 based on the loaded addresses. The input memory 12 responding to the read clock R-CLK outputs the sampled data on the start scan line P and the sampled data on the next scan line C which correspond to the pixel point to be currently interpolated, to the radial interpolation table 14. When the interpolation flag f is input from the interpolation data store 42, the address controller 50 does not supply the read clock R-CLK to the input memory 12. Thus, the radial interpolation table 14 continues to use the previously input sampled data when there are several radius values each having the same magnitude.

Meanwhile, when the sampled data from the input memory 12 is supplied to the radial interpolation table 14, the interpolation data store 42 supplies the interpolation coefficient I corresponding to the pixel point to be currently interpolated to the radial interpolation table 14. The radial interpolation table 14 calculates the pixel data corresponding to the current pixel point using the received interpolation coefficient I, and outputs the calculated pixel data to the frame memory 20. Here, the address controller 50 outputs the write address corresponding to the pixel distance data dx and dy applied from the interpolation data store 42 to the frame memory 20. The frame memory 20 stores the pixel data applied from the radial interpolation table 14 according to the write address. The pixel data stored in the frame memory 20 is displayed according to a general scan method for displaying such as a raster scan via a display 30.

Whenever a new event occurs, that is, a radius of a probe, a display angle, and the number of scan lines used for ultrasonic image display are changed, the DSP 62 newly calculates sampling clock, interpolation data, pixel distance data dx and dy and an interpolation flag f appropriate for the event, using the radius and θ calculation table 64 and the triangular function table 66.

As described above, the digital scan conversion method according to the present invention obtains the pixel data of desired pixel points, by interpolating the sampled data acquired from the points on the neighboring scan lines having the same radii as those of the pixel points, to thereby eliminate a positional error on a rectangular coordinate system, enhance the picture quality, and remove artifact.

While only certain embodiments of the invention have been specifically described herein, it will be apparent that numerous modifications may be made thereto without departing from the spirit and scope of the invention.

What is claimed is:

1. A digital scan conversion method in an ultrasonic system having a probe, the digital scan conversion method comprising the step of:

interpolating sampled data obtained from two sampling points which are positioned on two scan lines neighboring at least one pixel point and have the same radius as that of the at least one pixel point, in order to obtain pixel data corresponding to the at least one pixel point, wherein said interpolating step further comprises the steps of:
   (a) determining the radius and angle representing the at least one pixel point positioned between the two scan lines neighboring the at least one pixel point;
   (b) obtaining the sampled data from the sampling points on the two neighboring scan lines corresponding to the at least one pixel point determined in step (a); and
   (c) calculating the pixel data with respect to the at least one pixel point using an interpolation coefficient represented by a ratio of angles between the at least one pixel point determined in step (a) and the corresponding sampling points and the corresponding sampled data obtained in step (b).

2. The digital scan conversion method according to claim 1, wherein said interpolating step uses a ratio of an angle between the at lest one pixel point and each of the corresponding sampling points as an interpolation coefficient for obtaining the pixel data at the at least one pixel point.

3. A digital scan conversion method in an ultrasonic system having a probe, the digital scan conversion method comprising the steps of:

(a) obtaining a radius and angle representing each pixel point, the pixel points being changed by a unit distance on a rectangular coordinate system from a start pixel point;
   (b) judging whether or not the angle of each pixel point in said step (a) is a value between the angle of two scan lines neighboring said start pixel point and determining only pixel points positioned between the two scan lines as effective pixel points;
   (c) obtaining a ratio of angles between two scan lines neighboring each pixel point and the scan line of the pixel point as an interpolation coefficient, with respect to the effective pixel points determined in said step (b);
   (d) obtaining the sampled data from the sampling points which are positioned on the two neighboring scan lines and have the same radius as that of each pixel point, with respect to the effective pixel points determined in said step (b); and
   (e) calculating the pixel data with respect to the effective pixel points using the interpolation coefficient obtained in step (c) and the sampled data obtained in said step (d).

4. A digital scan conversion apparatus for use in an ultrasonic system having a probe, the digital scan conversion apparatus comprising:

interpolation data calculation means for calculating pixel points positioned between two neighboring scan lines, two sampling points for obtaining sampled data positioned on the two scan lines in correspondence to the pixel points, and interpolation data corresponding to the pixel points;

storage means for storing a sampling clock representing the sampling points and the interpolation data therein;

an input memory for storing the sampled data corresponding to the pixel points among an ultrasonic echo signal received by the probe, using the sampling clock stored in the storage means as a write clock, and outputting the stored sampled data according to a read clock;

a radial interpolation table for outputting pixel data with respect to the pixel points using a corresponding interpolation coefficient supplied from the storage means and the sampled data output from the input memory;

a frame memory for storing the pixel data output from the radial interpolation table; and an address controller for generating the read clock for reading the sampled data corresponding to the interpolation data stored in the storage means from the input memory, and a write address for storing the pixel data output from the radial interpolation table in the frame memory, on the basis of the pixel points output from the interpolation data calculation means.

5. The digital scan conversion apparatus according to claim 4, wherein said interpolation data calculation means comprises:

a triangular function table for storing triangular functions corresponding to an angle;

a radius and $\theta$ calculation table for storing a radius and an angle corresponding to the pixel points represented in the rectangular coordinate system;

a normalization table for normalizing a fractional part of the radius into a predetermined number of bits; and a digital signal processor for obtaining a start coordinate relating to the pixel points positioned on the two neighboring scan lines and calculating the interpolation coefficient corresponding to a pixel point, using the triangular function table and the radius and $\theta$ calculation table.

6. The digital scan conversion apparatus according to claim 4, wherein said interpolation coefficient is obtained by an angular ratio between a pixel point and each of the corresponding sampling points when a probe is positioned as the origin.

7. The digital scan conversion apparatus according to claim 6, wherein said digital signal processor sets an interpolation flag for distinguishing a firstly aligned pixel point from the remaining pixel points when a plurality of the pixel points have the same radius.

8. A digital scan conversion apparatus for use in an ultrasonic system having a probe, the digital scan conversion apparatus comprising:

interpolation data calculation means for calculating pixel points positioned between two neighboring scan lines, two sampling points for obtaining sampled data positioned on the two scan lines in correspondence to the pixel points, and interpolation data corresponding to the pixel points, wherein said interpolation data calculation means comprises, a triangular function table for storing triangular functions corresponding to an angle, a radius and $\theta$ calculation table for storing a radius and an angle corresponding to the pixel points represented in the rectangular coordinate system, a normalization table for normalizing a fractional part of the radius into a predetermined number of bits, and a digital signal processor for obtaining a start coordinate relating to the pixel points positioned on the two neighboring scan lines and calculating the interpolation coefficient corresponding to a pixel point, using the triangular function table and the radius and $\theta$ calculation table;

storage means for storing a sampling clock representing the sampling points and the interpolation data therein;

an input memory for storing the sampled data corresponding to the pixel points among an ultrasonic echo signal received by the probe, using the sampling clock stored in the storage means as a write clock, and outputting the stored sampled data according to a read clock;

a radial interpolation table for outputting pixel data with respect to the pixel points using a corresponding interpolation coefficient supplied from the storage means and the sampled data output from the input memory;

a frame memory for storing the pixel data output from the radial interpolation table; and an address controller for generating the read clock for reading the sampled data corresponding to the interpolation data stored in the storage means from the input memory, and a write address for storing the pixel data output from the radial interpolation table in the frame memory, on the basis of the pixel points output from the interpolation data calculation means.

9. The digital scan conversion apparatus according to claim 8, wherein said interpolation coefficient is obtained by a ratio of an angle between a pixel point and each of the corresponding sampling points when a probe is positioned as the origin.

10. The digital scan conversion apparatus according to claim 9, wherein said digital signal processor sets an interpolation flag for distinguishing a firstly aligned pixel point from the remaining pixel points when a plurality of the pixel points having the same radius.

* * * * *